United States Patent
Wallace et al.

(10) Patent No.: US 11,463,011 B1
(45) Date of Patent: Oct. 4, 2022

(54) HIGH VOLTAGE CONVERTER WITH SWITCH MODULES PARALLEL DRIVING A SINGLE TRANSFORMER PRIMARY

(71) Applicant: Solid State Power LLC, Dallas, TX (US)

(72) Inventors: Ken Wallace, Lewis Center, OH (US); George Mantov, Sofia (BG); Plamen Jordanoff, Dallas, TX (US)

(73) Assignee: Solid State Power LLC, Dallas, TX (US)

( * ) Notice: Subject to any disclaimer, the term of this patent is extended or adjusted under 35 U.S.C. 154(b) by 0 days.

(21) Appl. No.: 17/305,638

(22) Filed: Jul. 12, 2021

Related U.S. Application Data (60) Provisional application No. 62/705,779, filed on Jul. 15, 2020.

(51) Int. Cl.
*H02M 3/335* (2006.01)
*H02M 1/00* (2006.01)
*H02M 1/08* (2006.01)

(52) U.S. Cl.
CPC ....... *H02M 3/33571* (2021.05); *H02M 1/007* (2021.05); *H02M 1/08* (2013.01); *H02M 3/33573* (2021.05)

(58) Field of Classification Search
CPC ............. H02M 3/33571; H02M 1/007; H02M 3/33573
See application file for complete search history.

(56) References Cited

U.S. PATENT DOCUMENTS

| | | | | |
|---|---|---|---|---|
| 6,392,902 | B1 * | 5/2002 | Jang ................... | H02M 3/33569 363/56.02 |
| 8,385,504 | B2 * | 2/2013 | Hattrup ............. | H02M 7/53873 378/101 |
| 2020/0412273 | A1 | 12/2020 | Lukic et al. | |
| 2021/0152080 | A1 | 5/2021 | Lukic et al. | |
| 2021/0359594 | A1 * | 11/2021 | Zhang ................... | H02M 7/219 |

OTHER PUBLICATIONS

Johann W. Kolar, Jonas E. Huber, Solid-State Transformers: Key Design Challenges, Applicability, and Future Concepts, APEC 2016 conference, Mar. 20-24, 2016, Long Beach, California, USA Retrieved from <https://www.bes-publications.ee.ethz.ch/uploads/tx_ethpublications/apec_2016_sst_tutorial_FINAL-1.pdf> Apr. 19, 2022. See slide #75.

Alex Q. Huang, Solid State Transformer and FREEDM System Power Management Strategies, FREEDM Systems Center Seminar Series, Nov. 2, 2016, NC State University. Retrieved from <https://www.freedm.ncsu.edu/wp-content/uploads/2016/11/FREEDM-Seminar-Series-4-Power-Management-with-SSTs-by-Alex-Huang.pdf> Apr. 19, 2022. See p. 11.

Watson Collins, DC Conversion Equipment Connected to the Medium-Voltage Grid for Extreme Fast Charging Utilizing Modular and Interoperable Architecture, 2021 DOE Vehicle Technologies Office Annual Merit Review, Jun. 24, 2021, virtual meeting, USA. Retrieved from <https://www.energy.gov/sites/default/files/2021-06/elt236_collins_2021_o_5-14_420pm_KF_TM.pdf> Apr. 19, 2022. See p. 9.

* cited by examiner

*Primary Examiner* — Kyle J Moody
(74) *Attorney, Agent, or Firm* — Schonauer Law LLC; Matthew J. Schonauer (57) ABSTRACT

A multilink power converter with reduced winding voltage is disclosed. In the disclosed embodiments, multiple converters have their primaries or their outputs connected in series while using a single transformer winding connected to the converters' outputs through voltage blocking capacitors.

12 Claims, 8 Drawing Sheets

HIGH VOLTAGE CONVERTER WITH SWITCH MODULES PARALLEL DRIVING A SINGLE TRANSFORMER PRIMARY

PRIORITY CLAIM

This non-provisional utility application is claiming the benefit of provisional patent 62/705,779 filed on Jul. 15, 2020.

FIELD OF INVENTION

The present invention relates to the field of power conversion. Specifically, but not by way of limitation, the disclosure includes a novel modular converter with multiple modules driving a single transformer by applying its outputs in parallel over a single transformer winding.

BACKGROUND

This section provides background information to facilitate a better understanding of the various aspects of the disclosure. The statements in this section of this document are to be read in this light, and not as admissions of prior art.

Medium and high voltage converters and distribution transformers (DTs) are key components of the electrical grid providing voltage transformation and isolation from medium and high voltage AC distribution lines to lower level AC used by end customers. In recent years, both the supply of and demand for electrical power has begun to undergo major changes. On one hand the share of renewable energy generation has increased manifold, while on the other hand there has been a surge in demand of electronic devices requiring high quality power and/or DC power. These changes have brought new challenges to the electrical grid. Even though existing conventional DTs comply with current standards, they lack a lot of the capabilities which are or will be required by the evolving grid of the future. For example, they are not capable of power factor correction, voltage regulations, inherent DC connectivity, monitoring and control, stand-by energy loss reduction, UPS functionality, phase current balancing and other. Additionally, from an environmental and safety point of view, conventional DTs are large, heavy, use large amounts of raw materials and pose a number of safety and environmental hazards.

A solid state transformer (SST) utilizing wide-bandgap semiconductors offers a solution to the inadequacies of low frequency DTs. The SST uses a medium or high frequency transformer with power semiconductors connected in such a way that the SST replicates all the performance parameters of the conventional DT while also offering value-added features and opportunities for future upgrades and development.

Currently, there are three basic approaches to developing SST topology:
1. SST consisting of a number of equal modules connected in series at the high voltage (HV) port of the device. This enables the use of power semiconductors with lower voltage rating compared to that supplied by the grid operator. Every module consists of a power electronics converter, which includes a medium/high frequency power transformer. This approach significantly reduces the size and weight compared to the conventional unit.
2. SST utilizing electronic converter module or multiple modules rated at full voltage. The modules use conventional power conversion topologies with HV composite switches. One of the most common approaches is by using cascode-based HV switches.
3. SST utilizing a multiport transformer with a number of parallel windings on one side and multiple switching modules connecting each one to a separate transformer winding.

These three topology types have some issues that limit key advantages of SSTs such as significant size reduction, total efficiency, THD and reactive power consumption of the converter. A further drawback of existing solutions is the accompanying corona effect which can cause long term degradation of the converter and can significantly reduce its lifespan.

Therefore, a need exists in the field of SST technology as well as in any other cases when high voltage needs to be converted, for a power converter converting HV AC which addresses the above issues while still delivering the full range of SST capabilities.

BRIEF SUMMARY OF THE INVENTION

The present invention comprises a novel method of connecting the outputs of a number of converters to a single transformer primary winding. When the individual converters produce high frequency with a similar amplitude but different absolute voltage offset, they can deliver a sum of output currents to a single transformer primary winding when voltage blocking capacitors are used.

In some embodiments, the voltage blocking capacitors can also serve as resonant capacitors when a resonant conversion topology is implemented. In this case, the sum of the capacitance of the voltage blocking capacitors of all of the modules can be responsible for a part or the whole of the resonant capacity. The primary function of the voltage blocking capacitors is to provide the right voltage offset to each of the power converter module outputs and to enable connecting all of the outputs to a single transformer winding. This allows HV to be converted by using switches rated for lower voltage, as well as using lower voltage transformers. Also, when a converter is bidirectional or converts low voltage to HV, the invention allows lower voltage semiconductors and lower voltage transformers to be used in its output section.

BRIEF DESCRIPTION OF THE DRAWINGS

Some embodiments of the present invention are illustrated as examples. The disclosure may, however, be embodied in many different forms and should not be construed as limited to the embodiments set forth herein.

DETAILED DESCRIPTION OF THE INVENTION

The terminology used herein is for the purpose of describing the embodiments and is not intended to be a limiting factor of the invention.

New method of connecting multiple power converter modules with one side of the modules connected in series or in parallel, utilizing voltage blocking capacitors is disclosed herein. In the following description, for the purpose of explanation, numerous specific details are set forth in order to provide a thorough understanding of the present invention. It will be evident however, to one skilled in the art and the field, that the present invention may be made and practiced without these specific details.

The present disclosure is to be viewed as an elaboration of the invention and is not intended to limit the invention to the embodiments illustrated by the figures or the description below.

The present invention will be described by referencing the figures representing the preferred embodiments.

Figure 1:
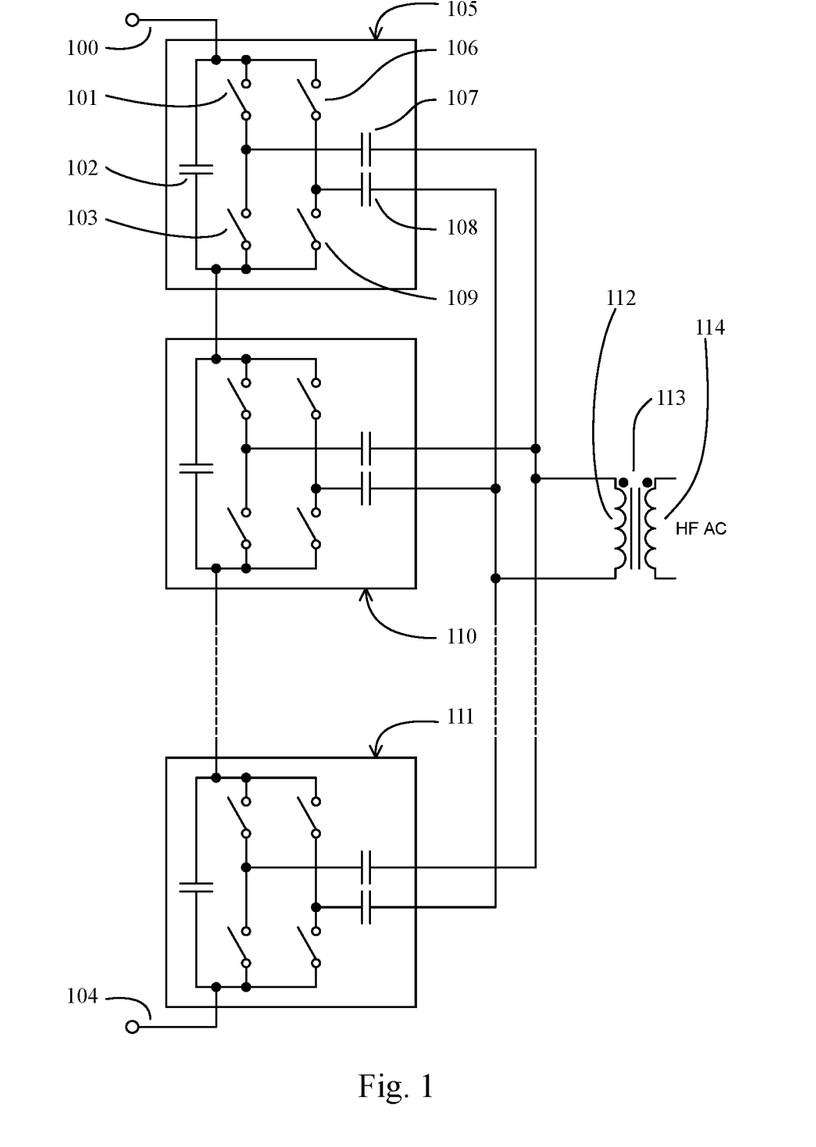
FIG. 1 depicts a High Voltage Power Converter consisting of multiple full bridge converter modules with primary sides connected in series and secondary sides connected in parallel through voltage blocking capacitors. The switches can be either unidirectional or bidirectional depending on the type of the input voltage (AC or DC).

FIG. 1 Detailed Description

The embodiment of FIG. 1 shows switch bridge modules 105, 110, 111 connected in series across high voltage (HV) input terminals 100 and 104. The HV input can be DC or low frequency (LF) AC such as the 50/60 Hz grid (or mains) voltage from the electric utility. The dotted lines between the top two modules and the lower one just indicate that more series modules could be used.

The top module will be described in detail. The remaining modules are similar. A module consists of two series switches forming what is known in the art as a "totem pole". Switches 101 and 103 make up one totem pole while 106 and 109 make up another. The two totem poles are connected in parallel to form a bridge circuit. The two totem poles are driven at high frequency (HF) out of phase, that is diagonal switches close and open together. For a typical application, the HF drive would be in the 20-100 kHz frequency range although the switch frequency may go beyond this range.

The four switches can be unidirectional or bi-directional for current flow and can be implemented using several semiconductor switch technologies such as IGBTs, MOSFETs or others. If the HV input is DC, then the switches can be unidirectional. If the HV input is AC, then bi-directional switches are required.

The bridge circuit has bypass capacitor 102 connected in parallel which stabilizes the voltage short term. The switch nodes of the two totem poles connect to blocking capacitors 107 and 108. The voltage at the switch nodes can be square waves, 180° out of phase with small deadtimes. A deadtime is a short gap between the ON times of the totem pole switches. This gap is small compared to the HF switch drive period so is typically less than one microsecond. The purpose of the deadtime is to allow low-loss switching to occur, a process known in the art as zero-voltage-switching or ZVS. Thus, the voltage out of the bridge (between the switch nodes) is a symmetric HF AC waveform.

The voltage blocking capacitors 107 and 108, as well as the voltage blocking capacitors associated with each switch bridge module are a key part of the invention, because they absorb different amounts of DC (or LF AC) voltage so the HF AC output of each module can be connected in parallel to feed a single transformer 113. Capacitors 107 and 108 block DC (or LF AC) but allow HF AC to transfer power.

The common load is HF transformer 113, with primary winding 112.

The secondary winding 114 of transformer 113 goes on to rectifiers or active circuits to generate the desired DC or AC output. These circuits are not shown in FIG. 1.

It is also possible for the circuit on FIG. 1 to accept power through winding 114 and to process it up to terminals 100 and 104, delivering in this way high voltage either AC or DC.

Figure 2:
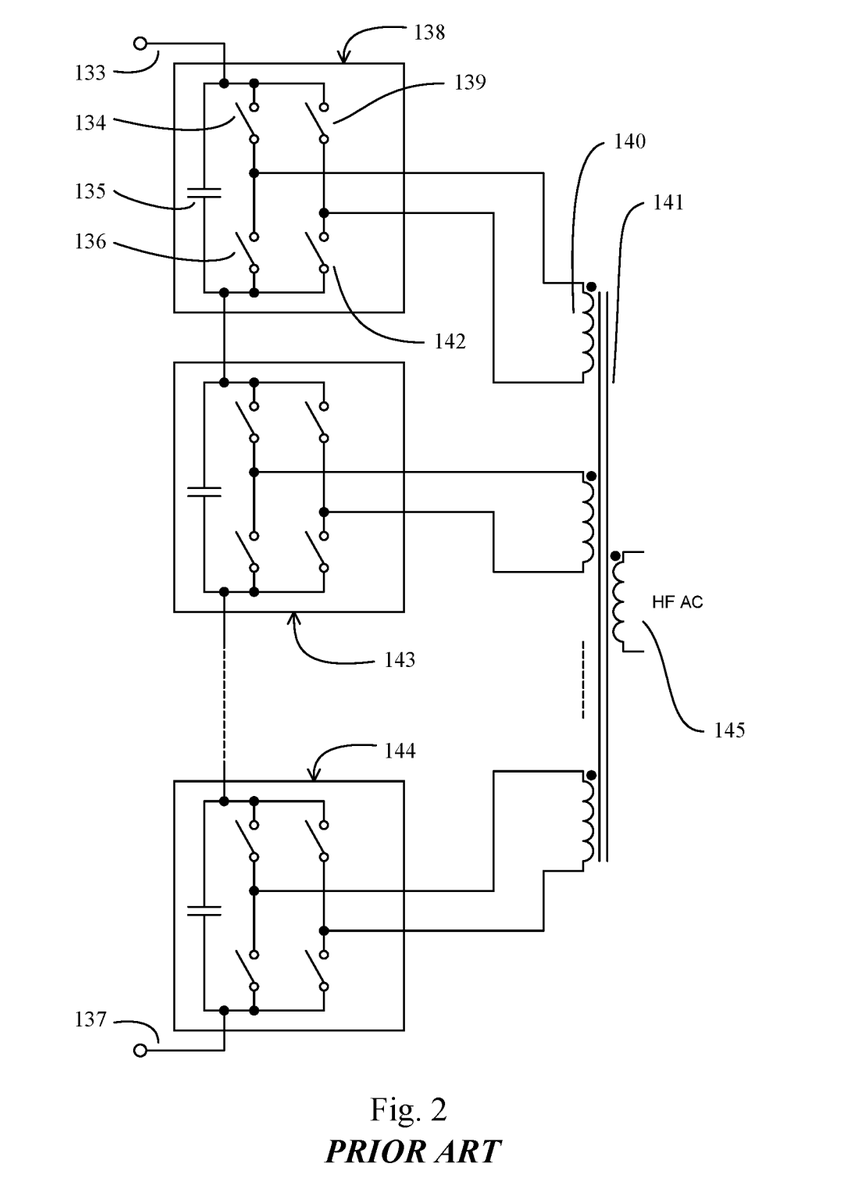
FIG. 2 shows the prior art, consisting of multiple full bridge converter modules, with primary sites connected in series and secondary sites connected to individual transformer windings.

FIG. 2 Detailed Description

The prior art embodiment is shown on FIG. 2. It shows switch bridge modules 138, 143, 144 connected in series across high voltage (HV) input terminals 133 and 137. The HV input can be DC or low frequency (LF) AC such as the 50/60 Hz grid (or mains) voltage from the electric utility. The dotted lines between the top two modules and the lower one just indicate that more series modules could be used.

The output of the switch bridge module 138 is connected to the HF transformer winding 140. The outputs of all the other switch bridge modules are also connected to dedicated windings of the HF transformer.

Figure 3:
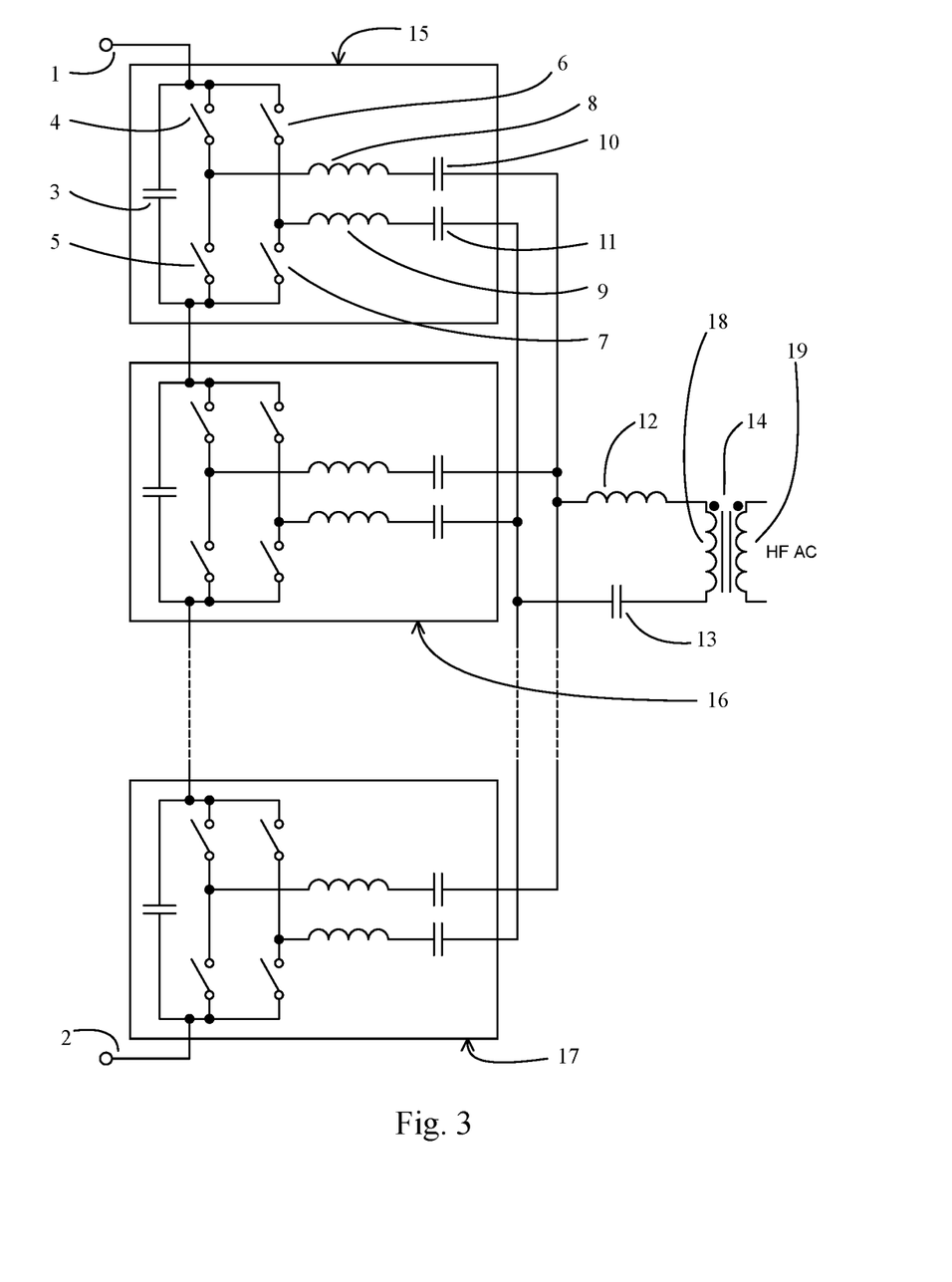
FIG. 3 depicts the basic implementation of the invention, as shown on FIG. 1, but with resonant inductors, added in series, with voltage blocking capacitors.

FIG. 3 Detailed Description

The embodiment of FIG. 3 shows switch bridge modules 15, 16, 17 connected in series across high voltage (HV) input terminals 1 and 2. The HV input can be DC or low frequency (LF) AC such as the 50/60 Hz grid (or mains) voltage from the electric utility. The dotted lines between the top two modules and the lower one just indicate that more series modules could be used.

The top module will be described in detail. The remaining modules are similar. A module consists of two series switches forming what is known in the art as a "totem pole". Switches 4 and 5 make up one totem pole while 6 and 7 make up another. The two totem poles are connected in parallel to form a bridge circuit. The two totem poles are driven at high frequency (HF) out of phase, that is diagonal switches close and open together. For a typical application, the HF drive would be in the 20-100 kHz frequency range although the switch frequency may go beyond this range.

The four switches can be unidirectional or bi-directional for current flow and can be implemented using several semiconductor switch technologies such as IGBTs, MOSFETs or others. If the HV input is DC, then the switches can be unidirectional. If the HV input is AC, then bi-directional switches are required.

The bridge circuit has bypass capacitor 3 connected in parallel which stabilizes the voltage short term. The switch nodes of the two totem poles connect to inductors 8 and 9. These inductors can be either coupled or not. The voltage at the switch nodes can be square waves, 180° out of phase with small deadtimes. A deadtime is a short gap between the ON times of the totem pole switches. This gap is small compared to the HF switch drive period so is typically less than one microsecond. The purpose of the deadtime is to allow low-loss switching to occur, a process known in the art as zero-voltage-switching or ZVS. Thus, the voltage out of the bridge (between the switch nodes) is a symmetric HF AC waveform.

After each inductor 8 and 9, there are blocking capacitors 10 and 11. These capacitors are a key part of the invention because they absorb different amounts of DC (or LF AC) voltage so the HF AC output of each module can be connected in parallel to feed a single transformer 14. Capacitors 10 and 11 block DC (or LF AC) but allow HF AC to transfer power.

The common load is HF transformer 14 which may have a primary discrete inductor 12 or the inductance may be inherent as leakage inductance. A popular power conversion circuit is a resonant scheme called an LLC circuit where transformer inductance is combined with a capacitor to utilize series resonance to achieve the aforementioned low loss switching. Thus capacitor 13 and/or capacitors 10 and 11 may function as part of this resonant circuit.

One concern about paralleling the bridge modules at the output is cross-current. This is a current that flows between modules (not to the transformer) and increases losses. The purpose of inductors 8 and 9, which are part of the LLC resonant circuit, is to limit cross currents that may arise due to component or timing tolerances. Inductors 8 and 9 may be coupled, thus having some mutual inductance.

The secondary winding 19 of transformer 14 goes on to rectifiers or active circuits to generate the desired DC or AC output. These circuits are not shown in FIG. 3.

It is also possible for the circuit on FIG. 3 to accept power through winding 19 and to process it up to terminals 1 and 2, delivering in this way high voltage either AC or DC.

Figure 4:
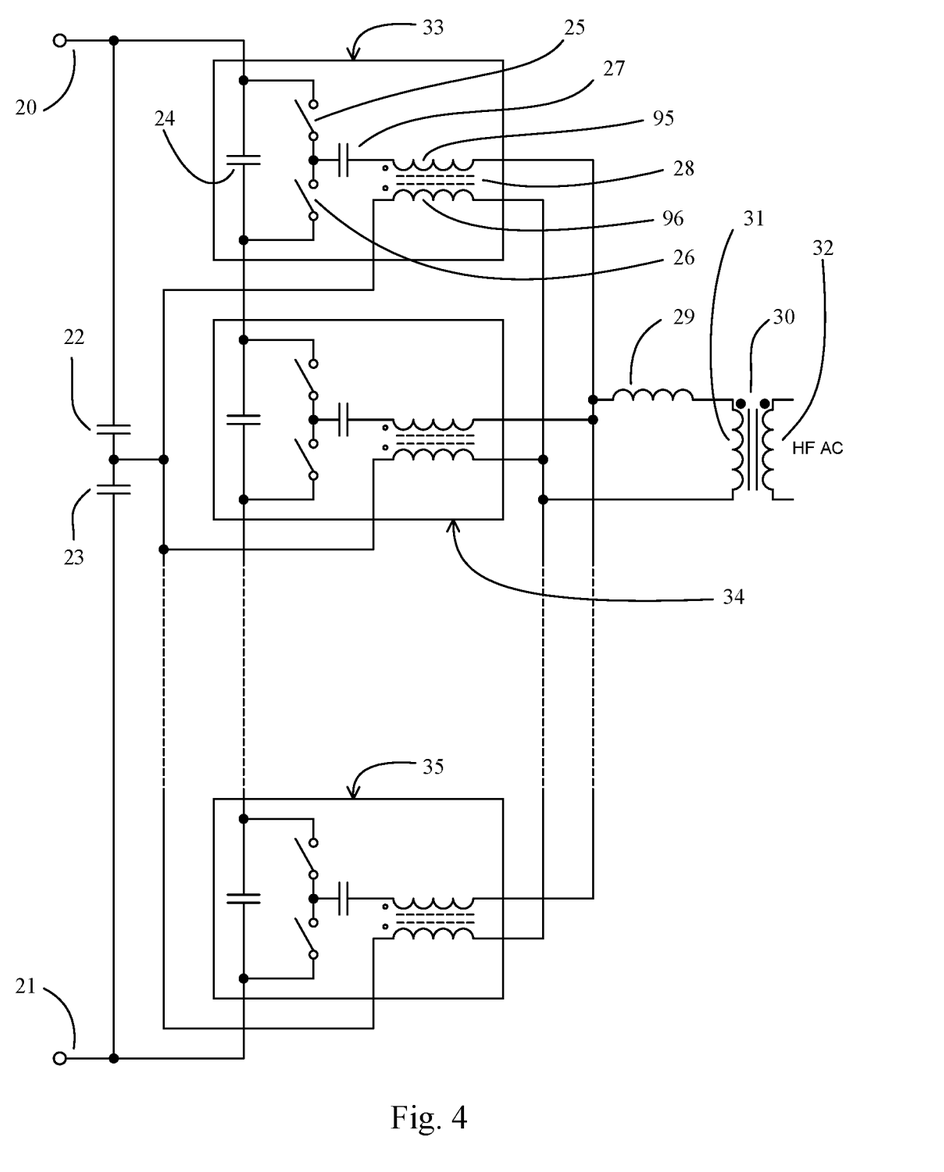
FIG. 4 shows a High Voltage Power Converter consisting of half bridge converter modules with primary sides connected in series and secondary sides connected in parallel through common mode inductors and voltage blocking capacitors. The presence of the common mode inductors helps balancing the currents that each module delivers and eliminates the effect of minor inequalities of the voltages of the bypass capacitors associated with each of the modules. The switches here again can be either unidirectional or bidirectional for converting DC or AC.

FIG. 4 Detailed Description

The embodiment of FIG. 4 shows several power converters based on half bridge topology, specifically the modules 33, 34 and 35 connected in series across the high voltage (HV) input terminals 20 and 21. The HV input can be DC or low frequency (LF) AC such as the 50/60 Hz grid (or mains) voltage from the electric utility. Additional modules may be included between the modules 34 and 35 as indicated by the dotted lines.

The top module 33 will be described but the remaining modules are similar. The module consists of two series switches 25 and 26, and a bypass capacitor 24. The load is connected between the middle point of the switches 25 and 26 and the middle point of the bypass capacitors 22 and 23 which are common for all of the modules. The core of this topology is known for anyone skillful in the art as a "half bridge".

The switches 25 and 26 make a half bridge converter together with the bypass capacitors 22 and 23. Note that the bypass capacitors 22 and 23 shown here are common for all of the modules, although in some embodiments different bypass capacitors may be associated with each module.

The switches 25 and 26 can be unidirectional such as MOSFETs, IGBTs or similar. Bidirectional switches can also be used at positions 25 and 26. When high voltage AC is applied at the input terminals 20 and 21, then bidirectional switches are appropriate. Respectively the unidirectional switches are more appropriate for converting DC power.

For a typical application, the drive frequency of the switches 25 and 26 would be in the 20-100 kHz frequency range although the switch frequency may go beyond this range.

The half bridge circuit has bypass capacitor 24 connected in parallel, which stabilizes the voltage short term. The switch node of the totem pole connects to the voltage blocking capacitor 27. This capacitor is a key part of the invention because it absorbs different amounts of DC (or LF AC) voltage, so the HF AC output of each module can be connected in parallel to feed a single transformer 30. In the embodiment shown on FIG. 4, the capacitor 27 is connected to the winding 31 of the transformer 30 through the common mode inductor 28 and the inductor 29. In some embodiments, one or two of these inductors may be absent.

The common load is a HF transformer 30, which may have a primary discrete inductor 29 or the inductance may be inherent as leakage inductance. A popular power conversion circuit is a resonant scheme where transformer inductance is combined with a capacitor to utilize series resonance to achieve the aforementioned low loss switching. Thus, capacitor 27 and/or capacitors 22 and 23 may function as part of this resonant circuit.

One concern about paralleling the bridge modules at the output is cross currents which are the currents that flow between modules (not to the transformer) and serve no useful purpose other than to increase power losses. The common mode inductor 28 addresses this problem. The inductor's windings 95 and 96 have little impedance for the current flowing from the half bridge to the transformer winding 31 but their impedance is high for the cross currents that flow between the nodes of the different half bridge modules. The other winding 32 of transformer 31 goes on to rectifiers or active circuits to generate the desired DC or AC output. These circuits are not shown in FIG. 4. The circuit on FIG. 4 can work in reverse, accepting power from the winding 32 or it can work bidirectionally.

Figure 5:
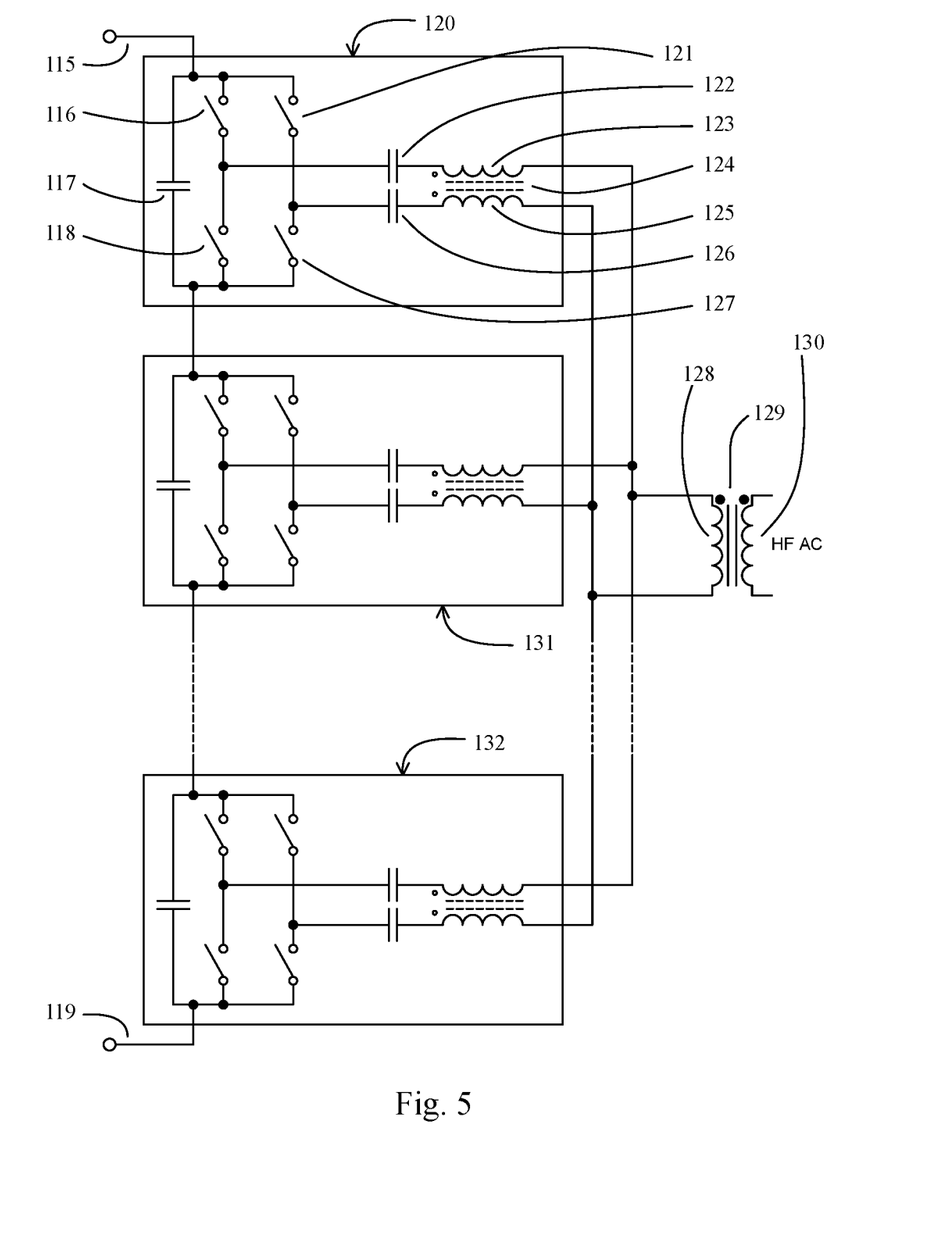
FIG. 5 shows one example of High Voltage Power Converter consisting of multiple full bridge converter modules with primary sides connected in series and secondary sides connected in parallel through voltage blocking capacitors. The common mode inductors included in this embodiment help balancing the currents that each module delivers and eliminate the inequalities of the parameters of the different modules. Again, the switches can be either unidirectional or bidirectional for converting DC or AC.

FIG. 5 Detailed Description

The embodiment of FIG. 5 is similar to the one shown on FIG. 1. It shows switch bridge modules 120, 131, and 132 connected in series across the high voltage (HV) input terminals 115 and 119. The HV input can be DC or low frequency (LF) AC such as the 50/60 Hz grid (or mains) voltage from the electric utility. The dotted lines between the top two modules and the lower one indicate more series modules could be used.

Similarly, to FIG. 1, FIG. 5 shows two blocking capacitors 122 and 126 placed in series with the output of each totem pole. These capacitors are connected in a way that allows all of the outputs of the bridge converter modules to absorb different amounts of DC (or LF AC) voltage so the HF AC output of each module can be connected in parallel to feed a single transformer 129. Capacitors 122 and 126 block DC (or LF AC) but allow HF AC to transfer power.

The difference that distinguishes the embodiment depicted on FIG. 5 from the embodiment depicted on FIG.

1 is that each bridge converter is connected to the power transformer through a common mode inductor. On module 120 for example, the power bridge consisting of the switches 116, 118, 121 and 127 has its output going through the common mode inductor 124 to the transformer 129. Specifically, the power bridge output goes through the windings 123 and 125 of the common mode inductor 124 to get connected to the winding 128 of the transformer 129.

In general, the voltages over the bypass capacitors of the different modules may be slightly different due to the natural differences between the actual values of the components used in the different modules. These types of minor differences lead to cross currents flowing between the modules.

The common mode inductor 124 has little impedance for the current that goes from the output of the power bridge to the transformer 129. However, the windings 123 and 125 of the common mode inductor 124 place a significant impedance on the route of the cross currents between the bridge modules. In this way the cross currents are reduced.

This circuit can operate in a reverse or bidirectional way when power is applied to the winding 130 and processed to the terminals 115 and 119.

Figure 6:
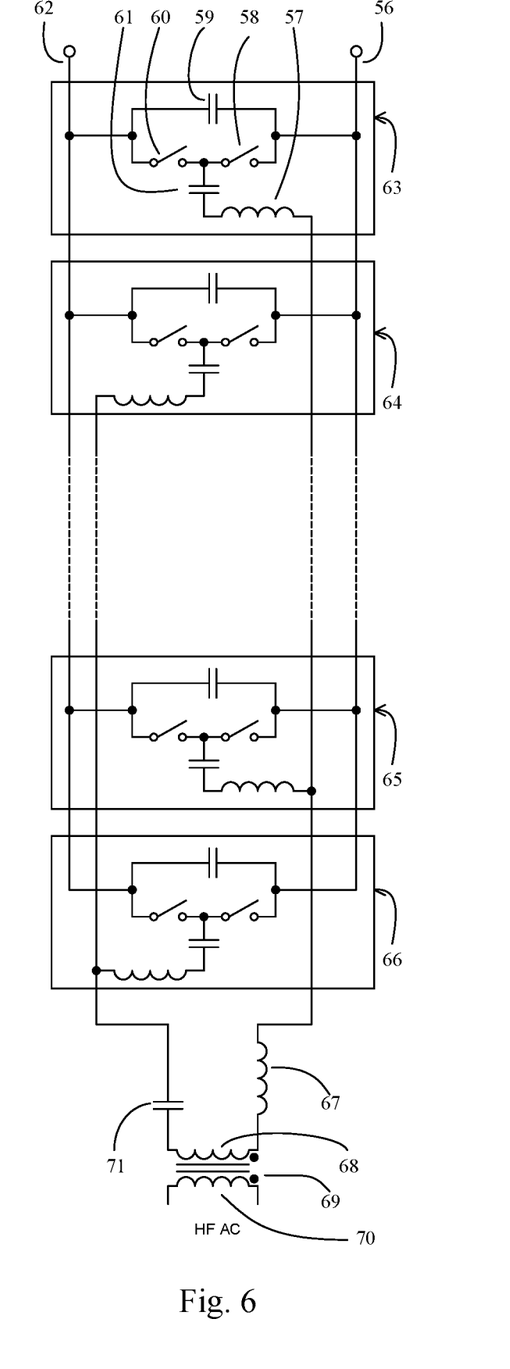
FIG. 6 illustrates a view of Parallel Connected Switch Modules, with primary sides connected in parallel and secondary sides connected to a single transformer winding through voltage blocking capacitors. The switches can be either unidirectional or bidirectional depending on the type of the input voltage (AC or DC).

FIG. 6 Detailed Description

The embodiment of FIG. 6 shows that the switch modules can be connected in parallel for increased power. This case would apply when the input voltage across terminals 56 and 62 was low enough that switch ratings did not require series connection. Operation is identical to the series modules except that all modules see the same input voltage.

Switches 58 and 60 form one totem pole in module 63. These switches are driven at high frequency (HF) to produce a PWM waveform at the center switch node. This PWM waveform is connected to capacitor 61 and inductor 57 and then on to the transformer primary winding 68 via inductor 67. Transformer 69 is a HF transformer that provides isolation and voltage transformation for the secondary winding 70 power processing circuits (not shown). The transformer primary current returns through capacitor 71 to module 64 which operates identically to module 63 except the switches are driven 180° out of phase. Each module has a bypass capacitor such as 59 to filter ripple currents generated by the HF switching.

The pair of modules 63 and 64 form a bridge circuit. Bridges are paralleled to increase the power that can be processed; thus, modules are added in pairs. Modules 65 and 66 are an example of such a pair.

One common power conversion circuit used in this application is the resonant LLC scheme mentioned in FIG. 3. Capacitor 61 and capacitors in the same positions in other parallel modules make up part of the series resonant circuit feeding transformer 69. Making these capacitors equal ensures totem pole currents will be balanced, thus sharing the total current to primary winding 68. Capacitor 71 is optional in case it is needed for the resonance circuit operation.

Inductor 57 is only needed to absorb switch drive timing differences which are typically exceedingly small (~10 nS). Most of the resonant inductance is supplied by inductor 67. It may be a discrete inductor or included in the transformer as leakage inductance.

The advantage of the embodiment of FIG. 6 is the flexibility to configure standard low-voltage converters to cover a wide power range. These are the same modules used in series for higher voltage inputs.

Figure 7:
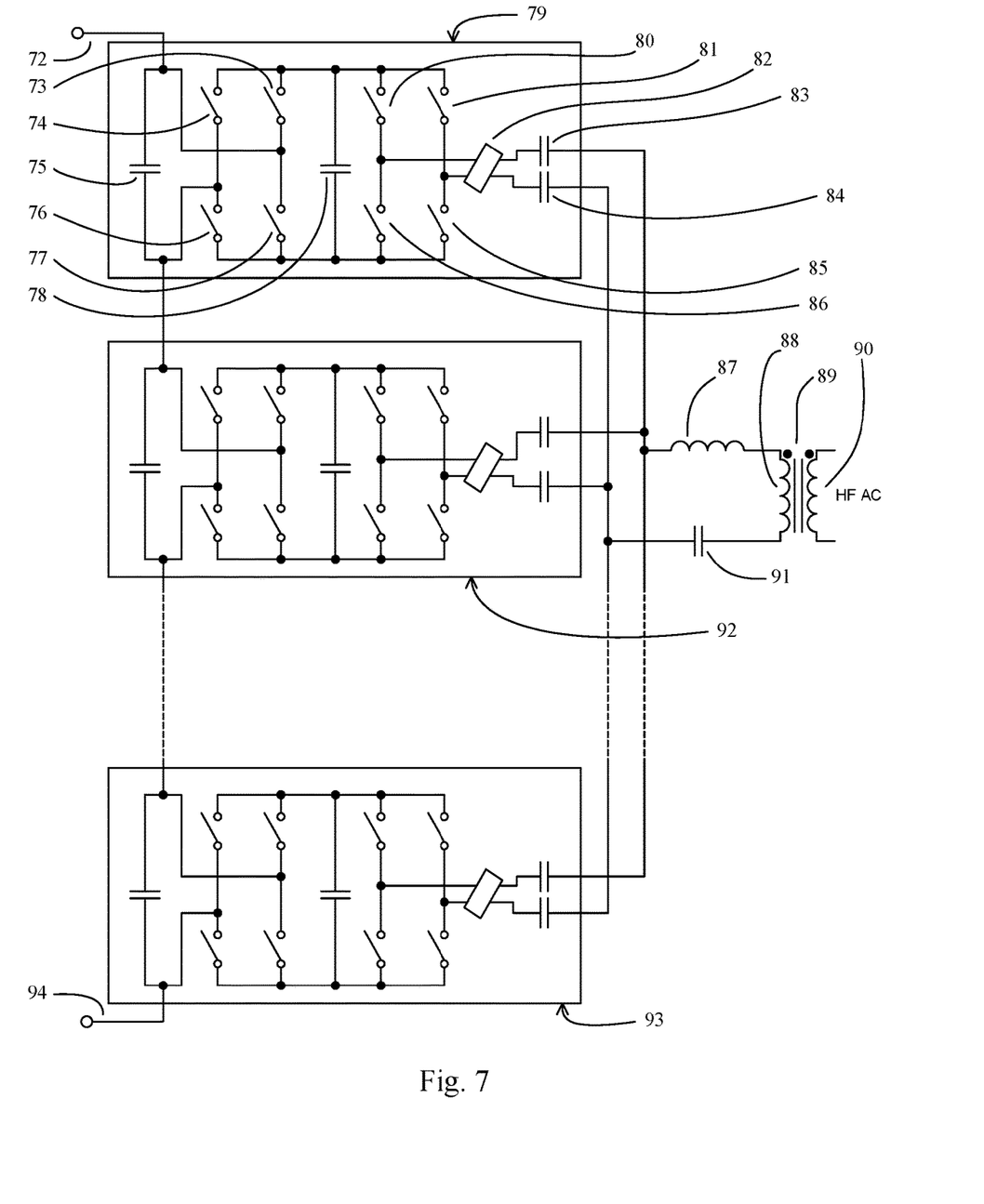
FIG. 7 depicts a Solid State Transformer based on a combination of power conversion modules with primary sides connected in series and secondary sides connected in parallel due to the use of voltage blocking capacitors. The switches here are likely to be unidirectional such as MOSFET transistors, while the converter operates with AC Voltage.

FIG. 7 Detailed Description

The embodiment presented in FIG. 7 depicts the AC converter such as the one used in the high voltage side of the AC-to-AC power converter modules, commonly known as solid state transformers (SST).

In this embodiment multiple converter modules are connected with their input sides in series and outputs in parallel. This allows them to convert high voltage low frequency power source such as medium voltage (MV) utility power. The novelty here is that all of the converter outputs are feeding a single transformer primary winding 88 with voltage much lower than the input MV. They do this due to the use of voltage blocking capacitors such as 83 and 84 in module 79.

The embodiment in FIG. 7 shows the bypass capacitors of the power conversion modules 79, 92, 93 connected in series across high voltage (HV) input terminals 72 and 94. The HV input is AC. The dotted lines between the top two modules 79 and 92 and the lower one 93 indicate more series modules could be used.

The top module 79 will be described but the remaining modules are similar. A module consists of two full bridge converters. The one on the left side is a low frequency bridge. It is built by the switches 74, 73, 76 and 77. It rectifies the input AC voltage and creates rectified half waves over capacitor 78. Capacitor 78 stabilizes the voltage short term. It is a bypass capacitor for the high frequency bridge built by the switches 80, 81, 85 and 86. The high frequency bridge has its output connected to the high frequency power transformer 89 through two voltage blocking capacitors 83 and 84. These capacitors are a key part of the invention because they absorb different amounts of DC (or low frequency AC) voltage so the high frequency AC output of each module can be connected in parallel to feed a single transformer 89. Capacitors 83 and 84 block DC (or LF AC) but allow HF AC to transfer power.

The capacitor 91 as well as the inductor 87 are presented in FIG. 7 to illustrate resonant operation, although their presence is optional.

The circuit presented on FIG. 7 utilizes unidirectional switches in most cases. The LF bridge switches with the AC line frequency which in most cases is 50 or 60 Hz. The HF bridge drive would be in the 20-100 kHz frequency range although the switch frequency in some cases may be above or below this range.

The minor differences in the switch times as well as the differences in components values and the voltages across some capacitors can lead to cross currents flowing between the HF bridges. In this embodiment ferrite beads are being placed between the output of each high frequency bridge and the transformer 89 primary winding 88. The bead in the module 79 is marked as 82. It will be evident to anyone skilled in the art that a common mode inductor, or regular inductors may be used in the same position for the same purpose.

The other winding 90 of transformer 89 goes on to rectifiers or active circuits to generate the desired DC or AC output. In case the embodiment from FIG. 7 serves as a high voltage converter of a SST, then the circuit connected to the winding 90 can be a mirror image of module 79 with or without the ferrite bead 82 and the capacitors 83 and 84.

This circuit is bidirectional and allows the power to be processed either way, from the terminals 72 and 94 to the transformer 89 or from the transformer 89 to the terminals 72 and 94.

Figure 8:
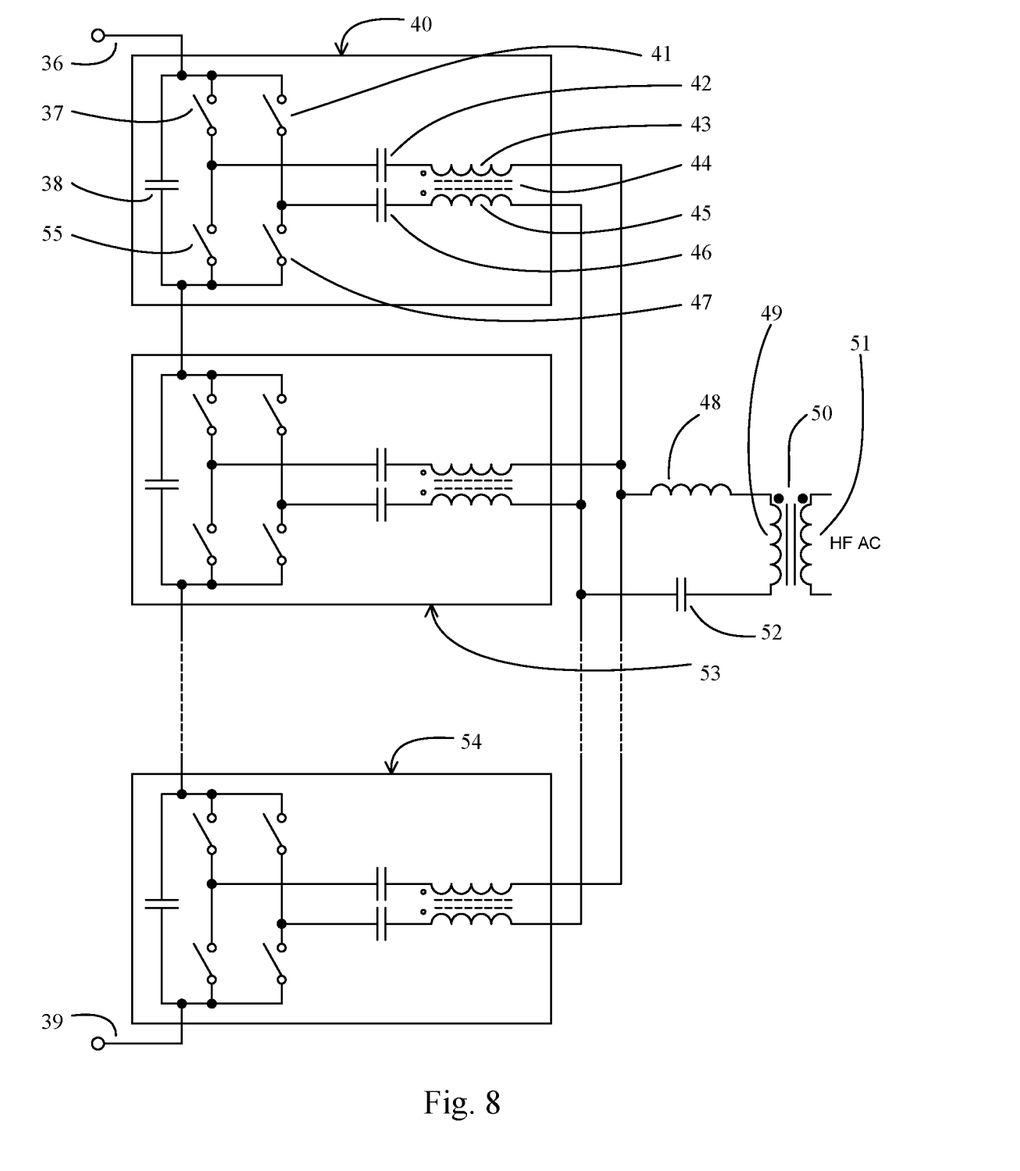
FIG. 8 depicts an implementation of the invention, similar to the one shown on FIG. 5, but working in a resonant converter circuit.

FIG. 8 Detailed Description

The embodiment of FIG. 8 is similar to the one shown on FIG. 3. It shows switch bridge modules 40, 53 and 54 connected in series across the high voltage (HV) input terminals 36 and 39. The HV input can be DC or low frequency (LF) AC such as the 50/60 Hz grid (or mains) voltage from the electric utility. The dotted lines between the top two modules and the lower one indicate more series modules could be used.

Similarly, to FIG. 3, FIG. 8 shows two blocking capacitors 42 and 46 placed in series with the output of each totem pole. These capacitors are connected in a way that allows all of the outputs of the bridge converter modules to absorb different amounts of DC (or LF AC) voltage so the HF AC output of each module can be connected in parallel to feed a single transformer 50. Capacitors 42 and 46 block DC (or LF AC) but allow HF AC to transfer power.

The difference that distinguishes the embodiment depicted on FIG. 8 from the embodiment depicted on FIG. 3 is that each bridge converter is connected to the power transformer through a common mode inductor. On module 40 for example, the power bridge consisting of the switches 37, 55, 41 and 47 has its output going through the common mode inductor 44 to the transformer 50. Specifically, the power bridge output goes through the windings 43 and 45 of the common mode inductor 44 to get connected to the winding 49 of the transformer 50. The embodiment depicted on FIG. 8 specifically shows resonant inductor 48 and capacitor 52 between all of the common mode inductors and the primary winding 49 of the transformer 50.

In general, the voltages over the bypass capacitors of the different modules may be slightly different due to the natural differences between the actual values of the components used in the different modules. These types of minor differences lead to cross currents flowing between the modules.

The common mode inductor 44 has little impedance for the current that goes from the output of the power bridge to the transformer 50. However, the windings 43 and 45 of the common mode inductor 44 place a significant impedance on the route of the cross currents between the bridge modules. In this way the cross currents are reduced.

This circuit can operate in a reverse or bidirectional way when power is applied to the winding 51 and processed to the terminals 36 and 39.

BASIC ADVANTAGES

The advantages of this novel scheme are:
1. By paralleling the module outputs, the input voltages are forced to be equal thus dividing the HV input equally across the series modules. This allows the use of lower voltage rated switches to improve availability and cost. The same is true if the circuit works in reverse or bidirectional ways. In those cases, it delivers high voltage by multiplying the voltage of the transformer winding.
2. Only one transformer is needed and its primary voltage is equal to the input voltage of the individual module. This lower voltage design avoids high dielectric issues such as excessive primary insulation and corona effect across the primary winding. It also facilitates achieving the desired leakage and magnetizing inductance.
3. A single module design can be replicated and used in series or in parallel for multiple applications.

What is claimed is:
1. A device for converting electrical power between an input voltage and a secondary isolated load, comprised of:
a high or medium frequency transformer comprising:
a high or medium frequency primary transformer winding comprising:
a first terminal; and
a second terminal;
a secondary transformer winding connected to the secondary isolated load; and
a plurality of primary switch modules connected in series across the input voltage,
wherein each primary switch module in the plurality of primary switch modules comprises:
a first switch node; and
a second switch node,
wherein the first switch node of each primary switch module in the plurality of primary switch modules are connected together via a first voltage blocking capacitor with the first terminal of the high or medium frequency primary transformer winding and the second switch node of each primary switch module in the plurality of primary switch modules are connected together via a second voltage blocking capacitor with the second terminal of the high or medium frequency primary transformer winding.

2. The device per claim 1, wherein each voltage blocking capacitor also serves as a series resonant capacitor when the high or medium frequency transformer is being used in a power converter of a resonant type.

3. The device per claim 1, wherein the first and second switch nodes of each primary switch module in the plurality of primary switch modules are each connected together with the first and second terminals, respectively, via a voltage blocking capacitor in series with an inductor or a common mode inductor to mitigate unwanted crosscurrents.

4. The device per claim 1, wherein a power flow is reversed to deliver high voltage DC or mains AC.

5. The device per claim 1, wherein the plurality of primary switch modules are based on MOSFETs, IGBTs, or any other type of power semiconductors.

6. The device per claim 1, wherein multiple switching modules have their outputs connected to more than one transformer winding, while the voltage blocking capacitors are still reducing the total voltage applied over the transformer primary windings to a fraction of the input voltage.

7. A device for converting electrical power comprising:
a high voltage input;
a load comprising:
a first terminal; and
a second terminal; and
a plurality of primary switch modules connected in series across the high voltage input, wherein each primary switch module in the plurality of primary switch modules comprises:
a first switch node; and
a second switch node,
wherein the first switch node of each primary switch module in the plurality of primary switch modules are connected together via a voltage blocking capacitor with the first terminal and the second switch node of each primary switch module in the plurality of primary switch modules are connected together via a voltage blocking capacitor with the second terminal.

8. The device per claim 7, wherein each voltage blocking capacitors also serves as series resonant capacitors when a resonant circuit is being used.

9. The device per claim 7, wherein the first and second switch nodes of each primary switch module in the plurality of primary switch modules are each connected together with the first and second terminals, respectively, via a voltage blocking capacitor in series with an inductor or a common mode inductor or other impedance to mitigate unwanted cross currents.

10. The device per claim 7, wherein a power flow is reversed to deliver high voltage DC or mains AC.

11. The device per claim 7, wherein the plurality of primary switch modules are based on MOSFETs, IGBTs, or any other type of power semiconductors.

12. The device per claim 7, wherein there is more than one load and each one of the loads is connected to more than one of the switching modules' outputs.

* * * * *